United States Patent
Bruchmann et al.

(10) Patent No.: US 6,696,505 B2
(45) Date of Patent: Feb. 24, 2004

(54) PREPARATION OF POLYURETHANE FOAMS

(75) Inventors: Bernd Bruchmann, Freinsheim (DE); Horst Binder, Lampertheim (DE); Heinz-Dieter Lutter, Diepholz (DE); Michael Hirn, Sandhausen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 43 days.

(21) Appl. No.: 09/908,404

(22) Filed: Jul. 18, 2001

(65) Prior Publication Data

US 2002/0035165 A1 Mar. 21, 2002

(30) Foreign Application Priority Data

Jul. 19, 2000 (DE) .......................... 100 35 400

(51) Int. Cl.⁷ ............................... C08G 18/28
(52) U.S. Cl. ................. 521/172; 521/137; 521/170; 521/173; 521/174
(58) Field of Search ................. 521/137, 170, 521/172, 173, 174

(56) References Cited

U.S. PATENT DOCUMENTS 3,284,415 A   11/1966   Horvath
3,314,901 A   4/1967    Daumiller et al.
3,770,810 A   11/1973   Dixon
4,542,166 A   9/1985    Mabuchi
4,732,960 A   3/1988    Rasshofer et al.
6,087,410 A * 7/2000    Falke et al. .................. 521/170

FOREIGN PATENT DOCUMENTS

DE    2245710     5/1973
WO    WO98/52987  11/1998

OTHER PUBLICATIONS

EPO Search Report Dated Oct. 23, 2001.

Translation of EPO Search Report Dated Oct. 23, 2001.

* cited by examiner

Primary Examiner—John M. Cooney, Jr.
(74) Attorney, Agent, or Firm—Fernando Borrego

(57) ABSTRACT

Polyurethane foams are prepared by reacting
  a) polyisocyanates with
  b) compounds having at least two hydrogen atoms reactive with isocyanate groups, by a process in which the polyisocyanates a) are aliphatic di- or polyisocyanates and the compounds having at least two hydrogen atoms reactive with isocyanate groups b) contain at least one acrylate polyol.

13 Claims, No Drawings

PREPARATION OF POLYURETHANE FOAMS

The present invention relates to a process for the preparation of light-stable polyurethane foams of low density by reacting aliphatic polyisocyanates with compounds having at least two hydrogen atoms reactive with isocyanate groups.

Polyurethane foams have long been known and are widely described in the literature. They are usually prepared by reacting isocyanates with compounds having at least two hydrogen atoms reactive with isocyanate groups. The isocyanates generally used are aromatic di- and polyisocyanates, isomers of tolylene diisocyanate (TDI), isomers of diphenylmethane diisocyanate (MDI) and mixtures of diphenylmethane diisocyanate and polymethylene-polyphenylene polyisocyanates (crude MDI) being of the greatest industrial importance.

However, such polyurethane foams based on aromatic isocyanates tend to yellow under the action of light. This tendency to yellow is troublesome for many applications. It is known that polyurethanes which are prepared using aliphatic isocyanates are light-stable and exhibit virtually no yellowing at all. However, the disadvantage of using aliphatic isocyanates for the preparation of polyurethane foam is that the foams thus prepared are generally substantially inferior in many respects, in particular in their mechanical properties, to those based on aromatic isocyanates. Particularly because of the insufficient formation of hard and soft phase segments in the foam, important material properties, such as elongation, tensile strength and flexibility, suffer, and aliphatic polyurethane foams are therefore scarely of any industrial importance to date.

WO 98/52987 describes the preparation of lightfast polyurethane foams using aliphatic isocyanates, hydrogenated polydienediols being used as the compound having at least two hydrogen atoms reactive with isocyanate groups. However, such diols are more expensive in comparison with the alcohols usually used. Moreover, these foams exhibit a deterioration in their mechanical properties and become tacky under the action of light.

U.S. Pat. No. 3,284,415 describes the preparation of polyurethanes, in particular cellular and foamed polyurethanes, by reacting monomeric diisocyanates or polyisocyanates with compounds having at least two hydrogen atoms reactive with isocyanate groups, copolymers of ethylene and from 4 to 35% by weight alkyl acrylates and/or hydroxyalkyl acrylates being used as compounds having at least two hydrogen atoms reactive with isocyanate groups. These ethylene/acrylate copolymers are used as the sole polyol component, and in particular aromatic di- and polyisocyanates such as tolylene diisocyanate, phenylene diisocyanate, diphenylmethane diisocyanate or diphenylmethane diisocyanat oligomer are used as diisocyanates. As a result of using the polyethylene acrylates, the mechanical properties of the polyurethanes, in particular the resilience and the impact strength at low temperatures, and the water resistance of the polyurethanes are improved.

DE-C-22 45 710 describes ethylenically unsaturated vinyl chloride copolymers which are liquid at room temperature and can be used as flameproofing agents in rigid polyurethane foams. However, no influence of the copolymers on the mechanical properties of the foams is mentioned.

It is an object of the present invention to provide light-stable polyurethane foams which have good mechanical properites, in particular elongation and tensile strength, and which can be prepared using starting materials customary in polyurethane chemistry.

We have found that this object is achieved, according to the invention, by using aliphatic polyisocyanates and polyacrylate polyols for the preparation of the polyurethane foams.

The present invention accordingly relates to a process for the preparation of polyurethane foams by reacting
a) polyisocyanates with
b) compounds having at least two hydrogen atoms reactive with isocyanate groups, wherein the polyisocyanates a) are aliphatic polyisocyanates and the compounds having at least two hydrogen atoms reactive with isocyanate groups b) contain at least one acrylate polyol.

The present invention furthermore relates to polyurethane foams which can be prepared by the process described above.

The present invention furthermore relates to polyol blends containing at least one acrylate polyol and at least one further alcohol, preferably an at least difunctional polyether alcohol or a polyester alcohol.

The acrylate polyols used are preferably low molecular weight acrylate polyols, i.e. those whose number average molecular weight is not more than 12 000, preferably not more than 8 000, particularly preferably not more than 6 000, g/mol and not less than 400 g/mol. Below, the terms acrylate polyols and polyacrylate polyols are used synonymously.

The acrylate polyols used according to the invention are prepared by polymerization of hydroxy-functionalized (meth)acrylates, preferably by copolymerization of hydroxy-functionalized (meth)acrylates with (meth)acrylates not having hydroxyl functional groups. Furthermore, they can also be prepared by copolymerization of said acrylate monomers with other aliphatic, ethylenically unsaturated monomers, for example ethene, propene, butene, isobutene, acrylonitrile, acrylamide, acrolein, vinyl esters of carboxylic acids or unsaturated carboxylic acids, such as maleic acid, fumaric acid or crotonic acid or derivatives thereof.

Such copolymerization can be carried out in reactors operated continuously or batchwise, for example kettles, annular gap reactors, Taylor reactors, extruders or tubular reactors.

Reaction conditions which lead to polymers having a low level of impurities are preferably chosen. Thus, in the preparation of the acrylate polyols used according to the invention, polymerization regulators are preferably not used.

In the preparation of the acrylate polyols used according to the invention, polymerization is preferably effected at above 160° C. in the absence of polymerization regulators and with very low initiator concentrations. The chosen procedure for the process is preferably such that acrylate polyols having average molar masses (Mn) of not more than about 12 000 g/mol are present at the end of the reaction.

Homopolymers of hydroxyalkyl (meth)acrylates or copolymers of hydroxyalkyl (meth)acrylates with (meth)acrylic monomers having no OH functional groups are preferred. In particular, halogen-free monomers are used in the preparation of the acrylate polyols used according to the invention.

The acrylate polyols used according to the invention are prepared in particular by polymerization of hydroxy-$C_1$- to $C_8$-alkyl (meth)acrylates, e.g. hydroxyethyl (meth)acrylate, hydroxypropyl (meth)acrylate, hydroxybutyl (meth)acrylate.

Particularly suitable acrylic monomers without OH groups, which, if required, may be used as comonomers are aliphatic monomers containing olefinic double bonds and having a wide range of chemical structures, for example alkenes of 2 to 6 carbon atoms, such as ethene, propene, butene or isobutene, acrylonitrile, acrylamide, acrolein, vinyl esters of carboxylic acids or unsaturated carboxylic acids, such as maleic acid, fumaric acid or crotonic acid or derivatives thereof, and particularly preferably alkyl (meth) acrylates having $C_1$- to $C_{10}$-alkyl groups, for example n-hexyl (meth)acrylate, cyclohexyl (meth)acrylate, n-butyl (meth)acrylate, propyl (meth)acrylate, ethyl (meth)acrylate, methyl (meth)acrylate, ethylhexyl (meth)acrylate and/or hexanediol di(meth)acrylate. Said monomers can be used individually or in any desired mixture with one another.

The acrylate polyols used according to the invention are preferably prepared by copolymerization of hydroxy-$C_1$- to $C_8$-alkyl (meth)acrylates with the (meth)acrylic monomers described above and having OH functional groups, any desired combination of different hydroxyalkyl (meth) acrylates with the (meth)acrylates having no functional groups being possible. Preferably, the OH-containing monomers are used in concentrations of from 5 to 95, particularly preferably from 10 to 80, mol %.

The number-average molar masses (Mn) of the acrylate polyols used according to the invention are particularly preferably not more than 6 000 g/mol, and the average OH functionalities are from 2 to 20 and the OH numbers are from 100 to 500 mg KOH/g. In the case of higher molecular weights and higher functionalities, the acrylate polyols are too viscous or solid and can therefore be processed only with difficulty in polyurethane systems. Moreover, the polyurethanes thus prepared have inadequate mechanical properties owing to the very high crosslinking.

The polyacrylate alcohols are preferably added in an amount of from 0.1 to 50, preferably from 0.5 to 40, particularly preferably from 1 to 30, parts by weight, based on 100 parts by weight of the compounds having at least two hydrogen atoms reactive with isocyanate groups b).

Polyester alcohols and preferably polyether alcohols having a functionality of from 2 to 8, in particular from 2 to 6, preferably from 2 to 4, and an average molecular weight of from 400 to 10 000, preferably from 1 000 to 8 000, g/mol are particularly suitable as compounds having at least two active hydrogen atoms b), which can be used together with the acrylate polyols used according to the invention.

The polyether alcohols can be prepared by known processes, generally by a catalytic addition reaction of alkylene oxides, in particular ethylene oxide and/or propylene oxide, with H-functional initiator substances, or by condensation of tetrahydrofuran. The H-functional initiator substances used in particular are polyfunctional alcohols and/or amines. Water, dihydric alcohols, for example ethylene glycol, propylene glycol or butanediols, trihydric alcohols, for example glycerol or trimethylolpropane, and alcohols having a higher functionality, such as pentaerythritol, sugar alcohols, for example sucrose, glucose or sorbitol, are preferably used. Preferably used amines are aliphatic amines of up to 10 carbon atoms, for example ethylenediamine, diethylenetriamine or propylenediamine, and aminoalcohols, such as ethanolamine or diethanolamine. The alkylene oxides used are preferably ethylene oxide and/or propylene oxide, an ethylene oxide block frequently being added at the chain end in the case of polyether alcohols which are used for the preparation of flexible polyurethane foams. Catalysts used in the addition reaction of the alkylene oxides are in particular basic compounds, potassium hydroxide being of the greatest industrial importance here. If the content of unsaturated components in the polyether alcohols is to be low, multimetal cyanide compounds, i.e. DMC catalysts, may also be used as catalysts.

For specific applications, in particular for increasing the rigidity of the flexible polyurethane foams, polymer-modified polyols may also be used. Such polyols can be prepared, for example, by in situ polymerization of ethylenically unsaturated monomers, preferably styrene and/or acrylonitrile, in polyether alcohols. The polymer-modified polyether alcohols also include polyether alcohols which contain polyurea dispersions and are preferably prepared by reacting amines with isocyanates in polyols.

For the preparation of flexible foams and integral foams, in particular difunctional and/or trifunctional polyether alcohols are used. For the preparation of rigid foams, in particular polyether alcohols which are prepared by addition reaction of alkylene oxides with tetrafunctional initiators or initiators having a higher functionality, such as sugar alcohols or aromatic amines are used.

Di- and/or trifunctional polyether alcohols which have primary hydroxyl groups, in particular those having an ethylene oxide block at the chain end or those which are based only on ethylene oxide, are preferably used for the preparation of flexible foams by the novel process.

The compounds having at least two active hydrogen atoms also include the chain extenders and crosslinking agents which, if required, may be concomitantly used. Preferably used chain extenders and crosslinking agents are difunctional and trifunctional alcohols having molecular weights of less than 400, in particular from 60 to 150, g/mol. Examples are ethylene glycol, propylene glycol, diethylene glycol, 1,4-butanediol, glycerol and trimethylolpropane. Diamines, too, can be used as crosslinking agents. If chain extenders and crosslinking agents are used, their amount is preferably up to 5% by weight, based on the weight of the compounds having at least two active hydrogen atoms.

The polyisocyanates used may be the conventional and known (cyclo)aliphatc di-, tri- and polyisocyanates. Examples of (cyclo)aliphatic di- or triisocyanates are tetramethylene 1,4-diisocyanate, hexamethylene 1,6-diisocyanate (HDI), isophorone diisocyanate (IPDI), 2-methylpentamethylene diisocyanate, 2,2,4- or 2,4,4-trimethylhexamethylene 1,6-diisocyanate, 2-butyl-2-ethylpentamethylene diisocyanate, 1,4-diisocyanatocyclohexane, 3-isocyanatomethyl-1-methyl-1-isocyanatocyclohexane, isocyanatopropylcyclohexyl isocyanate, xylylene diisocyanate, tetramethylxylylene diisocyanate, bis(4-isocyanatocyclohexyl)methane, lysine ester isocyanates, 1,3- or 1,4-bis(isocyanatomethyl) cyclohexane, 4-isocyanato-methyloctamethylene 1,8-diisocyanate and mixtures thereof. Hexamethylene 1,6-diisocyanate, isophorone diisocyanate, bis(4-isocyanatocyclohexyl)methane or mixtures of the isocyanates are preferably used.

Oligoisocyanates or polyisocyanates prepared from the monomeric isocyanates, in particular based on HDI and IPDI, are preferably used together with or in place of the monomeric isocyanates. These oligoisocyanates or polyisocyanates can be prepared from said di- or triisocyanates or mixtures thereof by linkage by means of urethane, allophanate, urea, biuret, uretdione, amide, isocyanurate, carbodiimide, uretonimine, oxadiazinetrione or iminooxadiazinedione structures. Urethane, allophanate, uretdione, biuret or isocyanurate-containing polymers of HDI or IPDI are preferably used here, the use of allophanate, biuret or isocyanurate-containing polymers based on HDI being particularly preferred.

For carrying out the novel process, further starting materials, in particular catalysts, blowing agents and assistants and/or additives can be concomitantly used, about which the following may be stated specifically:

The catalysts used for the preparation of the novel polyurethane foams are the conventional and known polyurethane formation catalysts, for example organic tin compounds, such as tin diacetate, tin dioctanoate or dialkyltin diluarate, and/or strongly basic amines, such as triethylamine, pentamethyldiethylenetriamine, tetramethyldiaminoethyl ether, imidazoles or preferably triethylenediamine. The catalysts are used preferably in an amount of from 0.01 to 5, especially from 0.05 to 2,% by weight.

A preferably used blowing agent for the preparation of the polyurethane foams is water, which reacts with the isocyanate groups with liberation of carbon dioxide. Physically acting blowing agents, for example carbon dioxide, hydrocarbons, such as n-pentane, isopentane, cyclopentane or cyclohexane, or halogenated hydrocarbons, such as tetrafluoroethane, pentafluoropropane, heptafluoropropane, pentafluorobutane, hexafluorobutane or dichloromonofluoroethane, can also be used together with or in place of water. The amount of the physical blowing agent is preferably from 1 to 15, in particular from 1 to 10,% by weight and the amount of water is preferably from 0.5 to 10, in particular from 1 to 5,% by weight.

The assistants and/or additives used are, for example, surfactants, foam stabilizers, cell regulators, external and internal lubricants, fillers, flameproofing agents, pigments, hydrolysis stabilizers and fungistatic and bacteriostatic substances.

In the industrial preparation of polyurethane foams, it is usual to combine the compounds having at least two active hydrogen atoms b) and the further starting materials and assistants and/or additives before the reaction to give a polyol component.

Further information about the starting materials used can be found, for example, in Kunststoffhandbuch, volume 7, Polyurethane, edited by Günter Oertel, Carl-Hanser-Verlag, Munich, 3rd edition 1993.

For the preparation of the novel polyurethanes, the organic polyisocyanates a) are reacted with the compounds having at least two active hydrogen atoms b) and said blowing agents, catalysts and assistants and/or additives (polyol component), the acrylate polyols used according to the invention preferably being added to the polyol component.

In the preparation of the novel polyurethanes, isocyanate and polyol components are combined in an amount such that the ratio of the number of equivalents of isocyanate groups to the sum of the active hydrogen atoms is from 0.6:1 to 1:1.4, preferably from 0.7:1 to 1:1.20.

The preparation of the polyurethane foams is preferably carried out by the one-shot process, for example with the aid of the high pressure or low pressure technique. The foams can be prepared in open or closed metallic molds or by the continuous application of the reaction mixture to belt lines for the production of foam slabs.

It is particularly advantageous to employ the two-component process in which, as stated above, a polyol component and an isocyanate component are prepared and are foamed. The components are preferably mixed at from 15 to 120° C., preferably from 20 to 80° C., and introduced into the mold or onto the belt line. The temperature in the mold is generally from 15 to 120° C., preferably from 30 to 80° C. If acrylate polyols having a viscosity above 10 000 mPas, measured at 23° C., are used, it is advantageous to predilute the acrylate with a low-viscosity OH component of the polyol mixture at about 50° C. and only thereafter to add it to the polyol mixture.

The acrylate polyols used according to the invention permit the preparation of resilient and viscoelastic flexible foams having low densities and excellent mechanical properties, for example very good flexibility, elongation and tensile strength and excellent aging resistance (compression set after autoclave aging).

According to the invention, it is also possible to prepare integral foams and rigid foams which, in addition to having very good mechanical properties, are distinguished from the prior art especially by the excellent aging resistance in the presence of moisture and heat and the light stability of the foams.

The examples which follow illustrate the invention.

The polyacrylate polyols shown in table 1 were used.

TABLE 1

| | Polyacrylate polyols | | | |
|---|---|---|---|---|
| Polyacrylate No. | Composition of the monomers (mol %) | Number average molar mass ($M_n$, g/mol) | Polydispersity ($M_w/M_n$) | OH number (mg KOH/g) |
| 1 | HEMA/BA 75:25 | 1719 | 1.63 | 299 |
| 2 | HEA/BA 25:75 | 1889 | 4.79 | 121 |
| 3 | HEA/BA 50:50 | 1751 | 2.15 | 241 |
| 4 | HEA/BA 50:50 | 2160 | 2.22 | 241 |
| 5 | HEA/BA/ HDDA 50:47:3 | 1476 | 4.46 | 241 |
| 6 | HEA/EHA/ HDDA 50:47:3 | 1289 | 2.52 | 241 |

HEMA: 2-hydroxyethyl methacrylate
BA: n-butyl acrylate
HEA: 2-hydroxyethyl acrylate
HDDA: hexanediol diacrylate
EHA: 2-ethylhexyl acrylate EXAMPLES 1 to 7

Flexible Foams

First, a polyol component was prepared from the compounds stated in table 2. 100 parts by weight of the polyol component and the amount in parts by weight, likewise stated in table 2, of the isocyanate component were heated to 60° C. separately from one another, combined at this temperature, homogenized by means of a stirrer and introduced into a mold heated to 60° C., open at the top and having the dimensions 40×40×40 cm. The foam formed was then cured at room temperature (23° C.) for 24 hours.

The characteristic data of the foams are recorded in table 3.

TABLE 2

Components for the preparation of the novel foams, in parts by weight

| Example | 1 | 2 | 3 | 4 | 5 | 6 | 7 |
|---|---|---|---|---|---|---|---|
| Polyol component | | | | | | | |
| Lupranol ® 2043 | 32.0 | 28.5 | 25.5 | 31.0 | 23.2 | 27.7 | 17.2 |
| Lupranol ® 2090 | 55.0 | 55.0 | 55.0 | 55.0 | 55.0 | 55.0 | 55.0 |
| Pluriol ® E 400 | 5.0 | 5.0 | 5.0 | 5.0 | 5.0 | 5.0 | 10.0 |
| Glycerol | 1.0 | 3.0 | 2.0 | 1.0 | 2.0 | 1.0 | 2.0 |
| 1,4-Butanediol | – | – | – | – | 0.5 | 2.0 | 0.5 |
| Ethanolamine | – | – | – | – | – | 1.0 | – |
| Polyacrylate (No.) from tab. 1, parts by weight | (1) 5.0 | (2) 5.0 | (2) 10.0 | (3) 5.0 | (5) 10.0 | (6) 5.0 | (3) 10.0 |
| DBTL | 0.5 | 1.0 | 1.0 | 0.5 | 0.3 | 0.3 | 0.3 |
| Water | 1.5 | 2.5 | 1.5 | 2.5 | 4.0 | 3.0 | 5.0 |
| Polyisocyanate component | | | | | | | |
| Basonat ® P LR 8926 | 77.4 | 46.0 | 68.7 | 87.3 | 135.3 | 53.6 | 164.0 |
| Basonat ® HI 100 | – | 46.0 | – | – | – | 53.6 | – |
| Foam type | Flexible foam, resilient | Flexible foam, resilient | Flexible foam, resilient | Flexible foam, resilient | Flexible foam, visco-elastic | Flexible foam, visco-elastic | Flexible foam, visco-elastic |

TABLE 3

Characteristic data of the flexible foams

| Example | 1 | 2 | 3 | 4 | 5 | 6 | 7 |
|---|---|---|---|---|---|---|---|
| Density (kg/m³) (according to DIN EN ISO 845) | 135.9 | 75.1 | 131.1 | 68.2 | 51.0 | 70.0 | 40.0 |
| Tensile strength (kPa) (according to DIN 53571) | 44.7 | 72.5 | 35.6 | 33.1 | 62.9 | 69.2 | 55.0 |
| Elongation (%) (according to DIN 53571) | 90 | 82 | 76 | 112 | 118 | 88 | 126 |
| Compressive strength (kPa) at 40% (according to DIN EN ISO 3386) | 7.66 | 5.69 | 6.37 | 2.24 | n.d. | 5.13 | n.d. |
| Compression set, 70° C., 50% compression, 22 h loading (%) (according to DIN 53572) | 0 | 0.1 | 0 | 0.5 | 0.2 | 0 | 0.7 |

EXAMPLE 8

Comparative Experiment

Aliphatic Flexible Foam Without Addition of a Polyacrylate

| Example (Comparison) | 8 |
|---|---|
| Polyol component | |
| Lupranol ® 2043 | 31.0 |
| Lupranol ® 2090 | 55.0 |
| Pluriol ® E 400 | 5.0 |
| Glycerol | 1.0 |
| 1,4-Butanediol | — |
| Ethanolamine | — |

-continued

| Example (Comparison) | 8 |
|---|---|
| Polyacrylate (No.) from tab. 1, parts by weight | — |
| DBTL | 2.0 |
| Water | 2.5 |
| Polyisocyanate component | |
| Basonat ® P LR 8926 | 81.6 |
| Basonat ® HI 100 | — |

The composition of comparative example 8 corresponded to that of novel example 4, but no acrylate was used here. The lack of an acrylate led to a substantial retardation of the reaction, and the DBTL catalysis therefore had to be adapted. The resulting foam was very flexible and remained tacky for a long time. After storage for 12 hours, the foam exhibited extreme shrinkage and no mechanical investigations could therefore be carried out.

EXAMPLES 9 to 11

Integral Foams

EXAMPLE 12

Rigid Foam

First, a polyol component was prepared from the compounds stated in table 4. 100 parts by weight of this polyol component and the amount in parts by weight, likewise stated in table 4, of isocyanate component were heated to 60° C. separately from one another, combined at this temperature and homogenized by means of a stirrer. The integral foam formulations were introduced into a closed mold heated to 60° C. and having the dimensions 20×20×4 cm. The resulting integral foam was then cured at room temperature (23° C.).

The rigid foam formulation was introduced into an unheated mold open at the top and having the dimensions 40×40×40 cm. The resulting rigid foam was then cured at room temperature (23° C.).

TABLE 4

Components for the preparation of novel integral foams, in parts by weight

| Foam No. | 9 | 10 | 11 | 12 |
|---|---|---|---|---|
| Polyol component | | | | |
| Lupranol 2043 | 28.2 | 28.0 | 30.4 | — |
| Lupranol 2090 | 55.0 | 55.0 | 55.0 | — |
| Lupranol 2042 | — | — | — | 72.2 |
| Pluriol E 400 | 5.0 | 5.0 | 5.0 | 5.0 |
| Glycerol | 1.0 | 1.0 | — | — |
| 1,4-Butanediol | — | — | 2.0 | — |
| TMP | — | — | 2.0 | — |
| Ethylene glycol | — | — | — | 10.0 |
| Polyacrylate (No.) from tab. 1, parts by weight | (3)10.0 | (3)10.0 | (4)5.0 | (3) 10.0 |
| DBTL | 0.3 | 0.5 | 0.3 | 0.3 |
| Water | 0.5 | 0.5 | 0.3 | 2.5 |
| Polyisocyanate component | | | | |
| Basonat P LR 8926 | 19.5 | 19.5 | 21.5 | — |
| Basonat HI 100 | — | — | 21.5 | 135.4 |
| Foam type | integral foam | integral foam | integral foam | rigid foam |
| Density (kg/m$^3$) | 530 | 353 | 504 | 122 |

Definition of the starting materials:
Basonat ® HI 100: polyisocyanate obtained from hexamethylene diisocyanate (HDI), NCO content = 22.0% by weight
Basonat ® P LR 8926:polyisocyanate obtained from HDI, NCO content = 19.0% by weight
Lupranol ® 2090: polyoxypropylenepolyoxyethylenetriol, hydroxyl number 28 mg KOH/g
Lupranol ® 2043: polyoxypropylenepolyoxyethylenediol, hydroxyl number 29 mg KOH/g
Lupranol ® 2042: polyoxypropylenepolyoxyethylenetriol, hydroxyl number 27 mg KOH/g
Pluriol ® E 400: polyoxyethylenediol, hydroxyl number 280 mg KOH/g
TMP: trimethylolpropane
DBTL: dibutyltin dilaurate
® : Registered trademark of BASF Aktiengesellschaft

We claim:

1. A process for preparation of polyurethane foams by reacting
   a) polyisocyanates with
   b) compounds having at least two hydrogen atoms reactive with isocyanate groups,
   wherein the polyisocyanates a) comprise aliphatic di- or polyisocyanates and the compounds having at least two hydrogen atoms reactive with isocyanate groups b)comprises at least one acrylate polyol and at least one alcohol selected from the group consisting of polyether alcohols, polyester alcohols, and mixtures thereof.

2. The process of claim 1, wherein the acrylate polyols have a molecular weight of not more than 12000 g/mol.

3. The process of claim 1, wherein the acrylate polyols are prepared by polymerization of hydroxy-functionalized (meth)acrylates.

4. The process of claim 1, wherein the acrylate polyols are prepared by copolymerization of hydroxy-functionalized (meth)acrylates with aliphatic monomers having no hydroxyl functional groups and containing olefinic double bonds.

5. The process of claim 1, wherein the acrylate polyols are prepared by copolymerization of hydroxy-functionalized (meth)acrylates with ethene, propene, butene, isobutene, acrylonitrile, acrylamide, acrolein, vinyl esters of carboxylic acids or unsaturated carboxylic acids.

6. The process of claim 1, wherein the acrylate polyols are prepared by copolymerization of hydroxy-functionalized (meth)acrylates with (meth)acrylates having no hydroxyl functional groups.

7. The process of claim 1, wherein the acrylate polyols are prepared by polymerization of hydroxyl-$C_1$- to $C_8$-alkyl (meth)acrylates.

8. The process of claim 1, wherein the acrylate polyols are prepared by copolymerization of hydroxyl-$C_1$- to $C_8$-alkyl (meth)acrylates with alkyl (meth)acrylates having $C_1$- to $C_{10}$-alkyl groups.

9. The process of claim 1, wherein the acrylate polyols are used in an amount of from 0.1 to 50 parts by weight, based on 100 parts by weight of the compounds having at least two hydrogen atoms reactive with isocyanate groups b).

10. The process of claim 1, wherein the polyisocyanates a) comprises hexamethylene 1,6-diisocyanate, isophorone dissocyanate, bis(4-isocanatocylohexyl)methane or mixtures of said polyisocyanates.

11. The process of claim 1, wherein the polyisocyanates a) are modified by incorporation of urethane, allophanate, urea, biuret, uretdione, amide, isocyanurate, carbodiimide, uretonimine, oxadiazinetrione or imnooxadiazinedione structures.

12. A polyurethane foam prepared according to the process claimed in claim 1.

13. The process of claim 5, wherein the unsaturated carboxylic acids comprise maleic acid, fumaric acid or crotonic acid or derivatives thereof.

* * * * *